United States Patent [19]

Mayberry

[11] Patent Number: 4,725,842
[45] Date of Patent: Feb. 16, 1988

[54] ISOLATION APPARATUS FOR A CONTINUOUS-WAVE RADAR SYSTEM

[75] Inventor: Ted R. Mayberry, San Diego, Calif.

[73] Assignee: Teledyne Industries, Inc., Los Angeles, Calif.

[21] Appl. No.: 742,102

[22] Filed: Jun. 6, 1985

Related U.S. Application Data

[63] Continuation-in-part of Ser. No. 423,660, Sep. 27, 1982.

[51] Int. Cl.$^4$ ............................................. G01S 13/32
[52] U.S. Cl. ........................................ 342/198; 455/24
[58] Field of Search .................. 343/5 R; 455/24, 82, 455/83; 342/198, 175

[56] References Cited

U.S. PATENT DOCUMENTS

| | | | |
|---|---|---|---|
| 3,056,127 | 9/1962 | Harris | 455/82 X |
| 3,099,794 | 7/1963 | Essam et al. | 342/198 X |
| 3,396,388 | 8/1968 | Goldie | 342/198 |
| 3,696,429 | 10/1972 | Tressa | 455/24 X |
| 4,134,068 | 1/1979 | Richardson | 455/82 X |
| 4,233,607 | 11/1980 | Sanford et al. | 455/24 X |
| 4,255,730 | 3/1981 | Sekine et al. | 342/175 |
| 4,259,743 | 3/1981 | Kaneko et al. | 342/175 X |
| 4,380,822 | 4/1983 | Broton | 455/83 X |
| 4,475,243 | 10/1984 | Batlivala et al. | 455/24 X |

FOREIGN PATENT DOCUMENTS 0133148 10/1980 Japan .................... 455/24
2065421 6/1979 United Kingdom ........... 455/24

OTHER PUBLICATIONS

Gawronski et al., "200W MIC L-Band Receiver Protector", Microwave Journal (U.S.A.), vol. 20, No. 5, pp. 43-46.

Goldie, "A High Power Broadband Millimeter-Wave Switch and Receiver Protector", Conference: 1978 IEEE MTTS Int'l Microwave Symp., Ottawa, Canada (Jun. 27-29, 1978), pp. 354-356.

Primary Examiner—Stephen C. Buczinski
Assistant Examiner—John B. Sotomayor
Attorney, Agent, or Firm—Brown, Martin, Haller & Meador

[57] ABSTRACT

Apparatus for isolating a radar receiver from a radar transmitter in a continuous wave, single antenna radar system where a circulator connects transmitter, receiver, and antenna. The apparatus includes a reactive element which reflects back through the circulator a portion of a transmission signal provided from the transmitter through the circulator to the antenna. The reflected transmission signal portion is equal in magnitude and opposite in phase to a leakage portion of the transmission signal transmitted by the circulator from the transmitter to the receiver. The reflected and leakage signal portions cancel in the circulator to enhance the isolation of the receiver.

11 Claims, 12 Drawing Figures

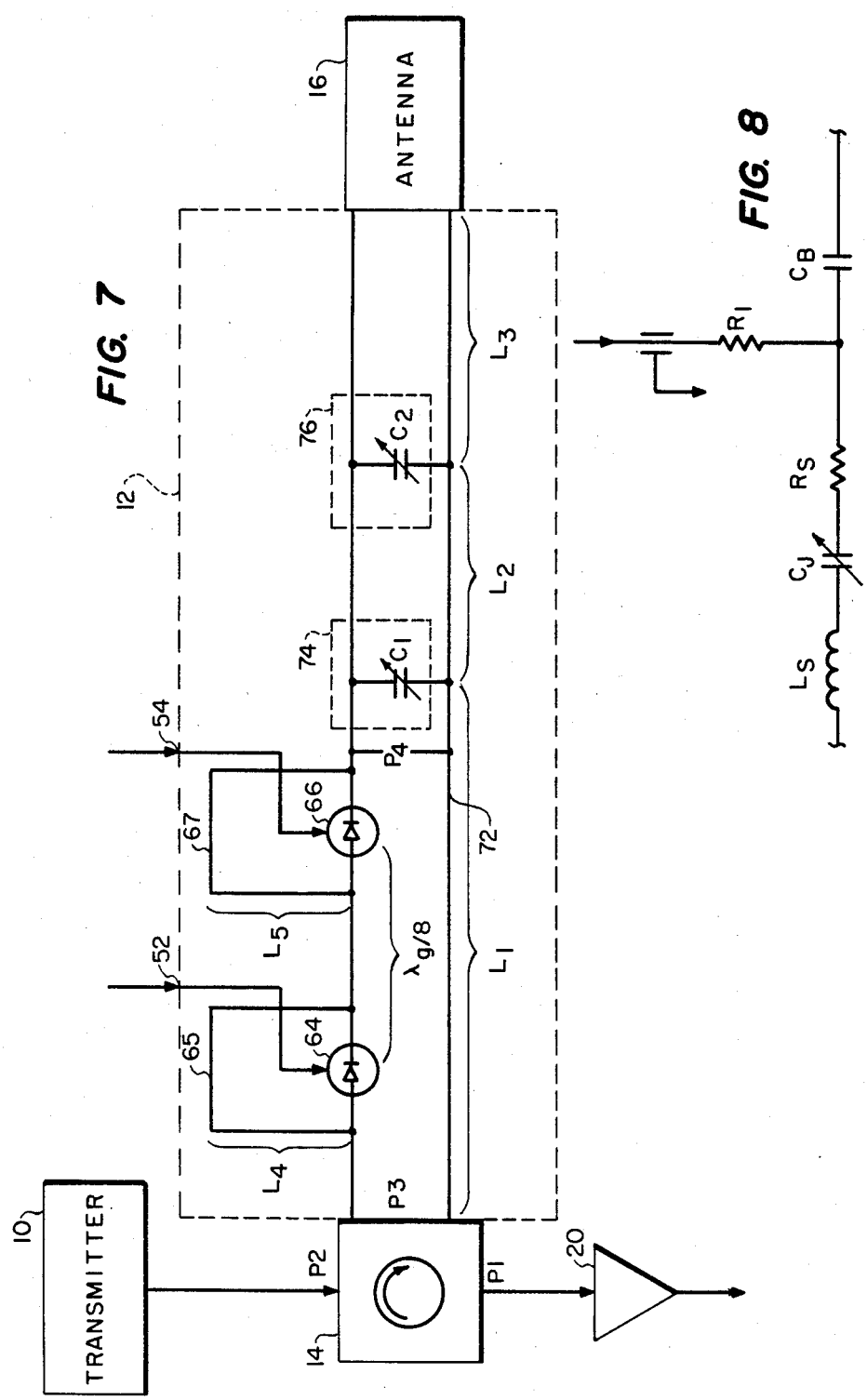

FIG. 11
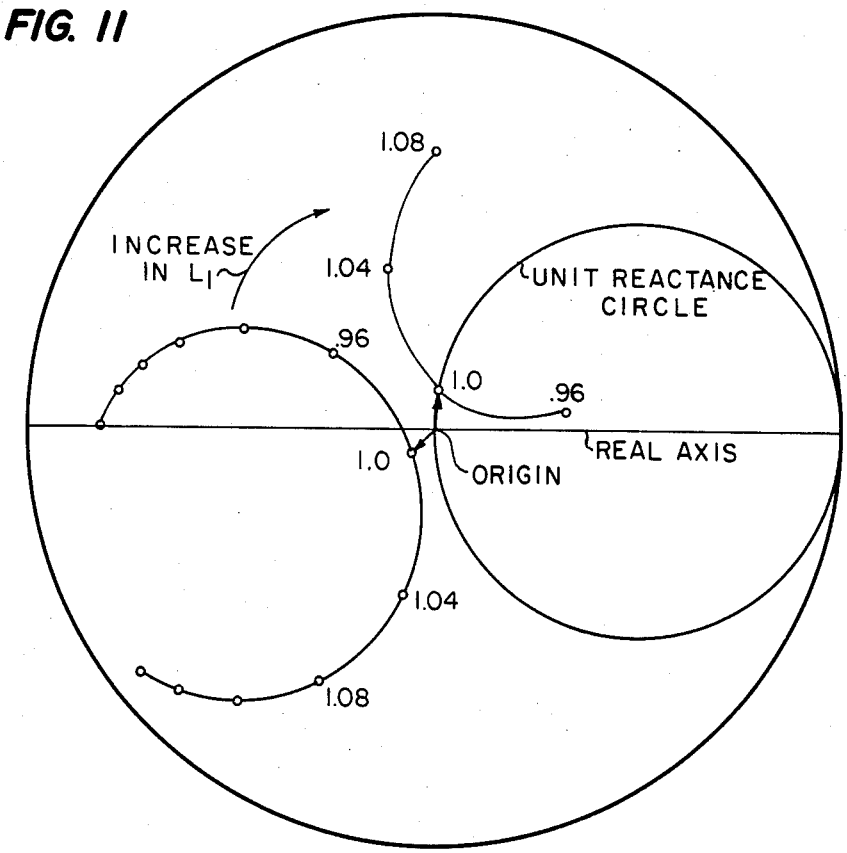
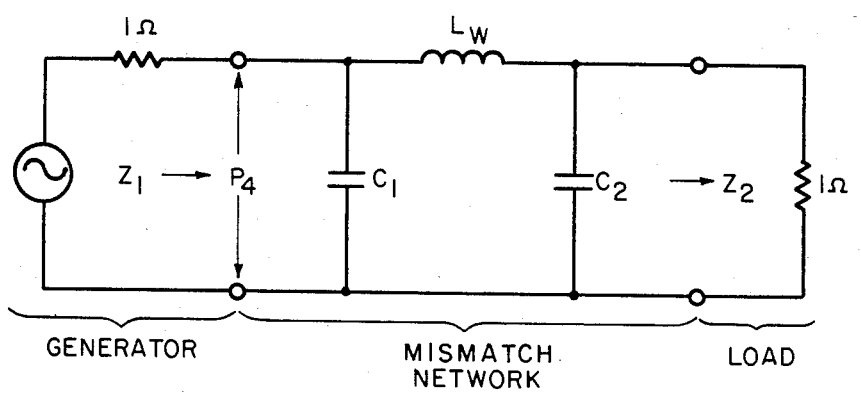
FIG. 9

ISOLATION APPARATUS FOR A CONTINUOUS-WAVE RADAR SYSTEM

This application is a continuation-in-part of U.S. patent application Ser. No. 423,660, filed Sept. 27, 1982, entitled "Antenna Tuner."

BACKGROUND OF THE INVENTION

The present invention relates to an apparatus for isolating a radar receiver from a radar transmitter in CW (continuous wave) radar applications utilizing a single antenna for transmitting and receiving.

In some transmitter/receiver applications such as radar, it is desirable to utilize the same antenna for both transmitting and receiving, thus saving the space required for a second antenna and maximizing the antenna gain. It may also be desired to transmit and receive on essentially the same frequency simultaneously as in the manner of CW Doppler radar or a type of frequency diverse radar where the diversity is a relatively small fractional bandwidth. In all cases but the simplest and lowest power, there is a need for a means to reduce the amount of transmitter signal that reaches the receiver input to reduce received transmitter noise and prevent receiver overload. This class of transmitter/receiver has transmitter and receiver frequencies so close to each other that satisfactory isolation of the receiver from the transmitter power by frequency filters alone is not possible.

In some low power applications, a non-reciprocal, multi-port isolation device such as a circulator is used to interconnect the transmitter, antenna and receiver. Such a device has the unique property that power flow between any two of its ports proceeds at low loss in the forward direction but has high loss in the reverse direction. The high loss direction can reduce the amount of transmitter power reaching the receiver input by approximately 25 to 30 db. This improvement in transmitter to receiver isolation allows higher transmitter power and therefore increased range.

As transmitter power is increased, a point is reached where receiver overload again occurs, the limit being set by the residual leakage signal of the circulator and by the reflection of the transmitter signal at the antenna. Careful tuning of the antenna and/or circulator can make further improvements in isolation, but the sensitivity of adjustment to environmental factors is increased and the isolation bandwidth is decreased.

The leakage signal that is transmitted by the circulator from the radar transmitter to the radar receiver poses two threats to the receiver. As the transmitter power increases, the leakage signal level increases and approaches the level of magnitude that will cause burnout of semiconductor devices in the input section of the receiver. Further, as the level of the leakage signal increases, but before the burnout level is reached, the leakage signal contributes to the noise figure of the receiver and reduces the achievable signal to noise ratio of the radar system.

The need to reduce the leakage transmitted by a circulator from the transmitter to the receiver has led to the concept of reflection of a portion of the transmitter signal by the isolation apparatus of the present invention. The isolation apparatus of the invention is arranged to intercept a portion of a transmission signal supplied through the circulator to the antenna and to reflect that portion back to the circulator with magnitude and phase characteristics which will, when the reflected portion is combined in the circulator with the leakage portion, cancel the leakage signal. The cancellation is effected over a predetermined frequency range corresponding to the major portion of the leakage signal spectrum. Thus, the performance of the invention is distinguishable from prior art assemblies such as double stub tuners and EH tuners that are used to reflect narrow band components; as is known, such narrow band return effectively cancels unwanted leakage signal power only at the center of the leakage signal band.

As isolation is improved by the apparatus of the invention through the provision of leakage signal cancellation over a relatively substantial leakage signal frequency range, more transmitter power can be used with concomitant improvements in radar system sensitivity and range. Further, since transmitter noise is reduced by this technique, receiver sensitivity can remain high.

Unless the circuitry is carefully designed, the bandwidth of operation will be severely limited and the susceptibility to environmental factors increased. The vectors which are summed must have low phase and amplitude sensitivities with respect to each other for best overall performance. Since the several vectors arrive at the summing point by different physical and electrical path lengths, their relative phases tend to diverge as bandwidth is increased causing a non-zero vector sum and loss of isolation. Reducing the spacial distribution of the circuitry and matching of electrical path lengths are necessary conditions for improving operating bandwidth.

SUMMARY OF THE INVENTION

The shortcomings of the prior art are overcome by the isolation apparatus of the present invention which has the ability for accurately cancelling the portion of a leakage signal contained in a predetermined frequency band which interferes with the operation of a radar receiver.

The isolation apparatus is useful in a radar system having a transmitter which operates continuously to produce a transmission signal, a receiver which operates simultaneously with the transmitter to receive target signals reflected from irradiated targets, an antenna, and a circulator for simultaneously coupling the transmitter and receiver to the antenna while isolating the receiver from the transmission signal produced by the transmitter. The apparatus of the invention improves the isolation of the receiver from the transmitter through the provision of a waveguide section connected between the circulator and the antenna for conducting the transmission signal to the antenna from the circulator and for conducting target signals from the antenna to the circulator for provision to the receiver. A reactive reflector is positioned in the waveguide for reflecting to the circulator a portion of the transmission signal which, over a predetermined leakage signal frequency range, has a magnitude that is substantially equal to the magnitude of a leakage portion of the transmission signal transmitted by the circulator to the receiver. The portion reflected by the reactive reflector further has, over the predetermined leakage signal frequency range, phase change characteristics substantially equal to the phase change characteristics of the leakage portion.

The waveguide containing the reactive reflector also includes, connecting the reactive reflector and the circulator, a waveguide section having a predetermined length $L_1$ which adjusts the phase of the reflected portion to be substantially opposite to the phase of the leakage portion over the predetermined leakage signal frequency range.

A principal objective of the isolation apparatus is the provision, in a radar system wherein a radar receiver and transmitter are jointly connected by a circulator to an antenna for simultaneous operation, of improved isolation of the receiver from the transmitter.

It is a further object of the present invention to provide such isolation over a predetermined frequency range that exceeds the frequency ranges presently achievable with conventional devices.

These and other objects and advantages of the present invention will become more evident when the following detailed description is read in conjunction with the below-described drawings.

DESCRIPTION OF THE DRAWINGS

FIG. 7 is a combined electrical schematic and block diagram representing the apparatus of the invention as an electrical transmission network.

FIG. 8 is the equivalent electrical schematic diagram of one of the diodes illustrated in FIG. 7.

FIG. 9 is a schematic illustration of a reactive reflecting network included in FIG. 7.

FIG. 11 is a conventional Smith plot illustrating the effect of the length of waveguide connecting the circulator and reactive reflecting circuit on the absolute phase of the reflected portion.

DETAILED DESCRIPTION OF THE PREFERRED EMBODIMENT

The primary objective of the isolation apparatus of the present invention is to prevent transmitter leakage signal and noise from entering sensitive radar receiver circuitry.

Figure 1:
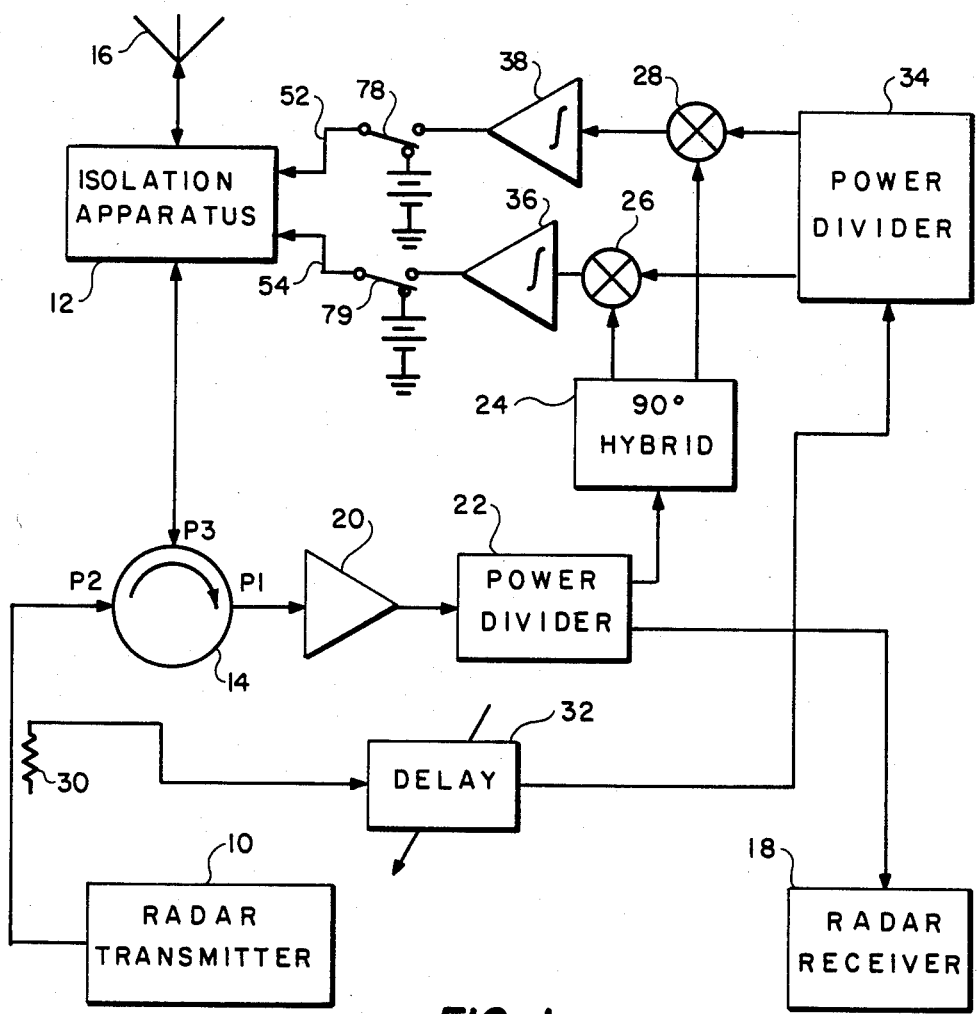
FIG. 1 is a block diagram of a radar system embodying the isolation apparatus of the present invention.

Referring to the drawings, particularly FIG. 1, a typical CW radar transmitter is shown at 10. The output of the transmitter 10 is passed to the isolation apparatus of the invention 12 through a conventional circulator 14 and is then radiated at antenna 16. Incoming radar return signals reach the radar receiver by way of the antenna 16, the isolation apparatus 12 and circulator 14. Some of the transmitter output power is lost along its transmission path to the antenna 16 and undesirably arrives at the input of the receiver 18. The most important losses with respect to the function of the circuitry of the isolation apparatus 12 are discussed here.

The most important undesired losses are circulator leakage and antenna reflection. The functions of the circulator 14 are to direct the transmitter signal towards the antenna 16 and to direct the received signal to the receiver 18. This is conventionally accomplished by a circulator design which provides transmissivity from port $P_2$ to $P_3$ and from port $P_3$ to $P_1$, while (ideally) providing no transmissivity from port $P_2$ to $P_1$. However, due to circulator imperfection, some of the transmitter signal is transmitted by the circulator 14 from port $P_2$ to $P_1$ toward the receiver 18. This is an undesired signal and is known as "circulator leakage". The function of the antenna 16 is to radiate the transmitter signal, but due to antenna imperfection, some power is reflected back to the circulator 14 and then to the receiver 18. This undesired signal is called "antenna reflection".

In prior art not using the isolation apparatus 12, the signal reaching the input of pre-amplifier 20 is the vector sum of the antenna reflection and circulator leakage signals. This resultant undesired signal is known as "leakage signal". This signal is typically twenty to thirty db smaller than the transmitter output, but it can be very much greater than the smallest radar return signal of interest. The leakage signal tends to jam the receiver 18 causing loss of receiver sensitivity. Consequently, there is a maximum transmitter power which can be used that will not limit receiver performance due to receiver overload and transmitter noise. Further, if the transmitter is driven at a high power level, the magnitude of the leakage signal can damage the input portions of the receiver.

The function of the isolation apparatus 12 is to reflect a portion of the transmitter signal back to the circulator 14 and hence to the receiver 18. This reflection is called the "reflected isolation signal". By proper accounting of the phases and amplitudes of the circulator leakage, antenna reflection and reflected isolation signals, these three signals may cancel. As discussed below, a reactive reflector in the isolation apparatus 12 is initially adjusted to provide a reflected isolation signal that is nearly equal in magnitude and phase change characteristics to the leakage signal. Physical and electrical characteristics of the apparatus 12 are selected to make the reflected isolation signal antiphase to the leakage signal so that it cancels the leakage signal. The function of the servo loop is to provide a continuing fine adjustment of the reflected isolation signals in phase and magnitude so that the vector sum of the three signals is maintained substantially at zero in the face of changes in radar system characteristics caused by component value drift.

The output signal of port $P_1$ of the circulator 14, including the residual leakage signal remaining after initial adjustment of the reactive reflecting and physical elements of the isolation apparatus 12 is amplified by preamplifier 20. This signal is split into two parts by power divider 22. One part goes to the remainder of the radar receiver 18 and the other continues on to quadrature hybrid 24. The two quadrature signals are then input to mixers 26 and 28.

A portion of the transmitter signal is coupled from the output of transmitter 10 by directional coupler 30, appropriately delayed at delay line 32 and then split into two equal in-phase parts by power divider 34. These signals are input to the mixers 26 and 28 and are known as "reference signals". These signals have not been subjected to that portion of the circuit that causes leakage signals. As the delay is varied, the reference vector is moved. A match up of the reference signal and the signal coming out of the power divider is needed and the delay line 32 is adjustable to do this. The delay line must provide the proper relationship so that the servo networks will be stable.

Each mixer 26 and 28 produces a DC voltage output which is proportional to the amplitude and cosine of the angle of the leakage signal. It can be said that this arrangement of circuit elements resolves the leakage signal into orthogonal components. Since it is desired to have a leakage signal of zero amplitude, any non-zero output of either mixer is called an error. The error signals drive amplifiers, preferably integrators 36 and 38, and electronically tunable reactive elements in the isolation apparatus 12 unitl the reflected isolation signal completely cancels the circulator leakage and antenna reflection.

A band pass filter (not shown) can be provided between the circulator 14 and the radar receiver preamplifier 20 in FIG. 1 to remove errors due to harmonics. Also, a power amplifier can be provided between directional coupler 30 and circulator 14 to prevent the loss of the directional coupler 30 from applying to the actual transmitter output power.

Figure 2:
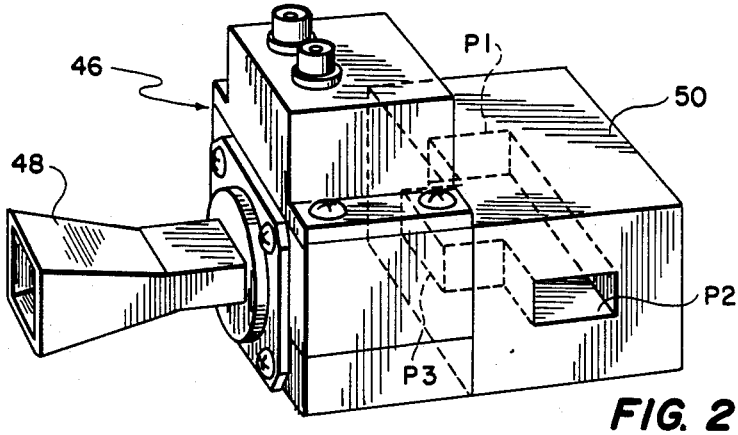
FIG. 2 is a perspective view of the isolation apparatus of the present invention positioned between an antenna horn and a circulator.
Figure 3:
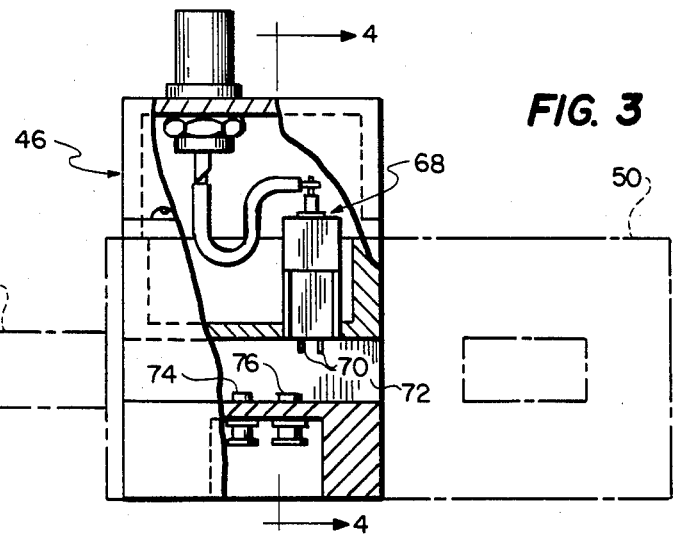
FIG. 3 is a side elevation view of the isolation apparatus of the present invention with a portion broken away and with the antenna horn and circulator shown in phantom.
Figure 4:
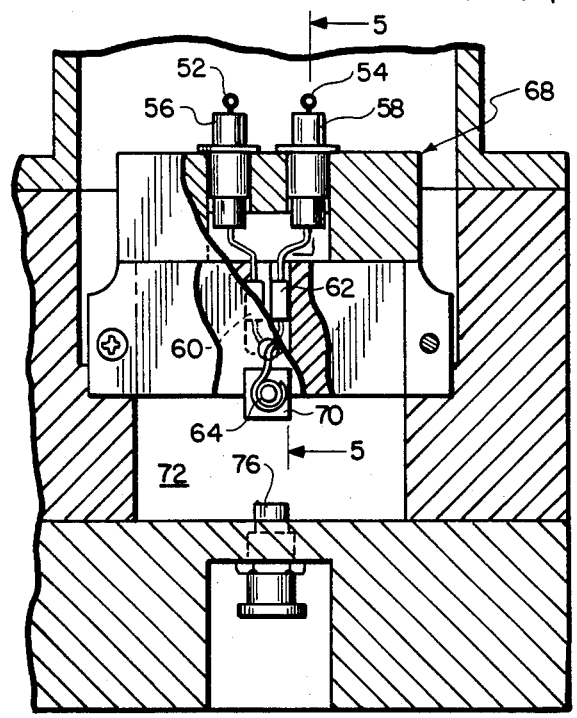
FIG. 4 is an enlarged sectional view taken along line 4—4 in FIG. 3 with portions broken away.
Figure 5:
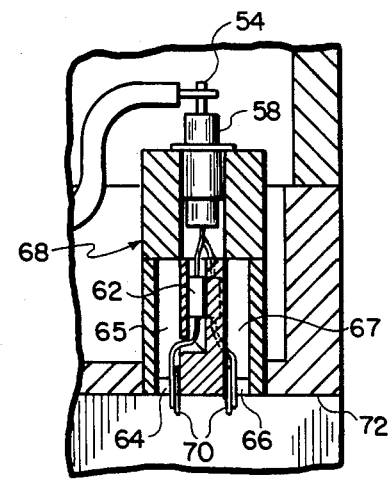
FIG. 5 is a sectional view taken along line 5—5 of FIG. 4.

The physical structure of the isolation apparatus 12 is shown in FIGS. 2-5 of the drawings. FIG. 2 shows the isolation apparatus connected between the antenna horn 48 and the circulator 50. Port $P_3$ of the circulator is connected to the apparatus 46. Port $P_2$ is adapted for connection to the radar transmitter (not shown) and $P_1$ is adapted for connection to the radar receiver preamplifier (not shown). The isolation apparatus 46 includes two leads 52 and 54 from the integrators 36 and 38 respectively (FIG. 1) that are feeding the in-phase (0 degrees) and quadrature (90 degrees) control bias signals through feed-through capacitors 56 and 58 (FIGS. 3-5) and bias resistors 60 and 62 to variable capacitance diodes 64 and 66 known as "varactors". The diode 64 is positioned at the bottom of a waveguide section 65, and the diode 66 is at the bottom of another waveguide section 67. The varactor diodes 64 and 66 are electrically grounded on one contact and the other contact is insulated from the housing 68 by thin insulating films 70. The varactors 64 and 66 are positioned adjacent a waveguide 72 of the isolation apparatus 46 and extend into the waveguide 72. The waveguide 72 provides for transmission of signals between the circulator 14 and antenna 16.

A pair of tuning screws 74 and 76 (FIG. 3) also extend into the waveguide section 72 of the isolation apparatus 46. These tuning screws are adjustable to determine the amount of the screw that extends into the waveguide section 72. The tuning screws 74 and 76 handle the high-power tuning of the isolation apparatus of the invention and the varactors 64 and 66 handle the fine tuning of the isolation apparatus of the invention.

To explain further, an alternative isolation apparatus is feasible which consists of variable capacitance diodes connected into the waveguide instead of tuning screws 74 and 76. In this alternative, the control bias signals provided by integrators 36 and 38 would be connected to the variable capacitance diodes now located in place of tuning screws 74 and 76. The varactor diodes 64 and 66 would not be needed for fine tuning since this function is provided by varactors at 74 and 76. It is well known that varactor diodes have a modest power capability which limits their application. This alternative isolation apparatus would expose the varactor diodes to the full transmitter power and consequently limit the maximum transmitter power. The design of this embodiment of the isolation apparatus recognizes that the varactors need only be exposed to a part of the transmitter power. The part is comparable to the variation in adjustment of vectors needed to account for variation in circuit element values. Normally circuit element variation will be small, say less than 5 or 10%. This implies that the transmitter power could be ten times or more in the preferred embodiment of the isolation apparatus than in the just-described alternative embodiment.

Initial adjustment of the isolation apparatus is done by providing a bias voltage for the varactor diodes 64 and 66 to provide a starting position while switches 78 and 79 are in the tune position (FIG. 1). The tuning screws 74 and 76 are then adjusted for the best bandwidth and null. Environmental changes, such as temperature changes, for example, change the elements of the system and the null is lost. To accommodate this change, the voltage on the varactors 64 and 66 must be changed. A temporary initial bias voltage is supplied to the varactors 64 and 66 when switches 78 and 79 are in the tune position shown in FIG. 1 of the drawings, and during that time adjustments are made with the tuning screws 74 and 76 for isolation and bandwidth. Once the adjustments are made, the initial bias voltage is removed and the switches 78 and 79 are switched to the closed loop position through integrators 36 and 38. The integrators 36 and 38 then provide the voltage and make any needed adjustments when a null error is detected at mixers 26 and 28. They handle variations in time, vibration and other environmental conditions as well as temperature.

Figure 6:
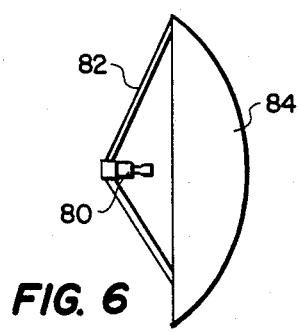
FIG. 6 is a side elevation of an antenna including a reflector dish and the antenna tuner, circulator and horn supported adjacent the reflector dish.

The circulator isolation apparatus antenna horn assembly is shown at 80 in FIG. 6 connected by suitable supports 82 to antenna reflector dish 84.

FIG. 7 is an electrical diagram that illustrates the equivalent circuit of the isolation apparatus 12 positioned between the circular 14 and the antenna 16. As shown, the waveguide 72 is conventionally coupled between port $P_3$ of the circulator 14 and the antenna 16. The waveguide 72 transmits transmission signals output by the transmitter 10 from the circulator 10 to the antenna 16 for radiation by the antenna. Simultaneously with the operation of the transmitter 10, radar return signals from irradiated targets are detected by the antenna 16 and transmitted by the waveguide 72 into the circulator 14 through port $P_3$ of the circulator, whence they are transmitted through port $P_1$ to the receiver 20. The waveguide 72 has a characteristic impedance $Z_0$.

The adjustable screw 74, represented in FIG. 7 by its electronic equivalent, the adjustable capacitor $C_1$, is positioned in the waveguide 72 so that a predetermined length $L_1$ of the waveguide 72 is travelled by a transmitted wave between the port $P_3$ and the capacitor $C_1$. The screw 74 is separated by another length $L_2$ of the waveguide 72 from the second adjustable screw 76, illustrated in FIG. 7 by its electrical equivalent, the adjustable capacitor $C_2$. A third length $L_3$ of the waveguide 72 separates the adjustable capacitor $C_2$ and the input port of the antenna 16. The varactor diodes 64 and 66 are positioned along one interior surface of the waveguide 72 and are enclosed in the closed waveguide sections 65 and 67, respectively. The waveguide sections 65 and 67 have lengths $L_4$ and $L_5$, respectively wherein $L_4 = L_5$. In fact, $L_4$ and $L_5$ are quarter-wavelenth shorted sections that prevents leakage from the waveguide 72 through the apertures in which the varactor diodes 61 and 66 are positioned. As is known, each of the varactor diodes 64 and 66 can be represented by an equivalent circuit such as is presented in FIG. 8. In FIG. 8, the varactor diodes and 66 can be represented by an equivalent circuit such as is presented in FIG. 8. In FIG. 8, the varactor diode 64 is represented by a series combination consisting of an equivalent inductance $L_S$, an equivalent resistance $R_S$, and adjustable junction capacitance $C_J$. As is conventional, the value of the capacitance $C_J$ of the varactor diode 64 is directly related to the polarity and magnitude of the bias supplied across the diode through the biasing resistor $R_1$. The varactor diode 64 is separated from the varactor diode 66 by a predetermined distance $\lambda_g/8$ which is equivalent to ⅛ the wavelength of the center frequency of the transmission signal transmitted from the transmitter 10 to the antenna 16.

The effect produced by the isolation apparatus 12 on a transmission signal provided through the port $P_3$ into the waveguide 72 can be understood with reference to FIG. 7. Each of the varactor diodes 64 and 66 represents a lumped reactive element having an adjustable impedance. As the transmission signal wavefront passes each of the elements, the equivalent circuit causes a portion of the transmission signal to be reflected back toward the circulator 14. The distance separating the varactor diodes 64 and 66 ($\lambda_g/8$) insures that, at the center frequency of the transmission signal, the reflected signals will be orthogonal, that is they will have a phase difference of 90°. The phase and magnitude of the respective portions of the transmission signal reflected by the varactor diodes 64 and 66 is directly related to the equivalent impedance of the diodes, which is established by the junction capacitance.

After travelling past the varactor diodes 64 and 66, the transmission signal will next encounter a reactively reflecting mismatch network including the adjustable capacitors $C_1$ and $C_2$ in combination with the section of the waveguide 72 having length $L_2$ that separates the capacitors. As is known, the length of waveguide $L_2$ and the adjustable capacitors $C_1$ and $C_2$ are the equivalent of a lumped pi circuit.

A pi circuit corresponding to the mismatch network consisting of the capacitors $C_1$ and $C_2$ and the waveguide section separating them is illustrated in FIG. 9; the waveguide section is represented by its electronic equivalent, the inductance $L_w$. It will be evident to the skilled microwave artisan that the value of the inductance $L_w$ is determined by the length $L_2$ of the waveguide separating the variable capacitors $C_1$ and $C_2$.

The mismatch network in the waveguide 72 reflects a portion of the transmission signal which, when combined in the waveguide 72 with the orthogonal portions reflected by the varactor diodes 64 and 66, forms the reflected isolation signal. The magnitude and phase characteristics of the reflected isolation signal are principally established by the reactance of the mismatch network in the waveguide 72. As is known, the pi network generates a reflected wave having a magnitude and phase characteristic over a frequency band that is determined by the value of the reactive components of the pi circuit making up the mismatch network. In the practice of the isolation apparatus of the invention, the values of the reactive components (the capacitance resulting from the adjustment of the screws 74 and 76 and the inductance resulting from the length $L_2$) are selected to provide mangtude and phase change characteristic that track that corresponding characteristics of the leakage signal. The characteristics of the leakage signal can be determined empirically, for example, by measuring the leakage signal at the port $P_1$ with the radar system placed in conventional operation. Alternatively, the forward and reverse transmission paths of the circulator 14 and the reflection characteristics of the antenna 16 could be measured independently in the laboratory and the results combined analytically to determine leakage characteristics.

Once the magnitude and phase characteristics of the leakage at port $P_1$ of the circulator are determined, the reactive values in the pi network positioned in the waveguide 72 can be analytically derived using well-known computer design methods. Table I tabulates eight design cases produced by the inventor and reveals the essential features of the design choices to be made by the practitioner of this invention. Referring to FIG. 9 and Table I, the entries in Table I are created from initial choices of the impedance mismatch ratio $Z_2/Z_1$, where $Z_1$ represents the input impedance of the mismatch network, measured at $P_4$, the input to the mismatch network, and $Z_2$ the load impedance of the antenna 16. The mismatch ratio $Z_2/Z_1$ leads to a value of a reflection coefficient $\rho$. The Q (quality) of the pi circuit is independently selectable within limits.

Figure 10A:
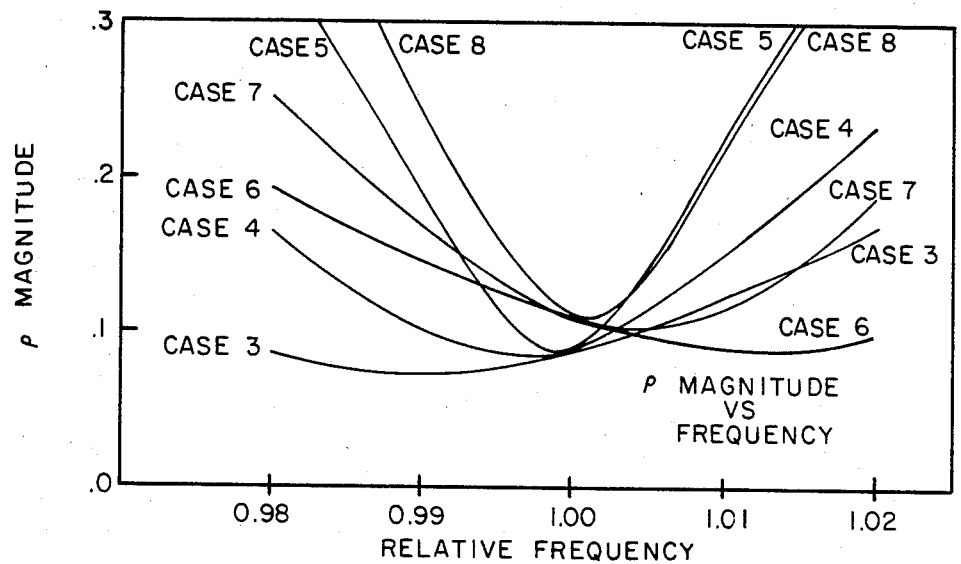
FIGS. 10A and B are relative frequency plots illustrating how varying component values in the reactive reflecting network of FIG. 9 affects the magnitude and phase change, respectively, of a portion of a transmission signal reflected back to the circulator.
Figure 10B:
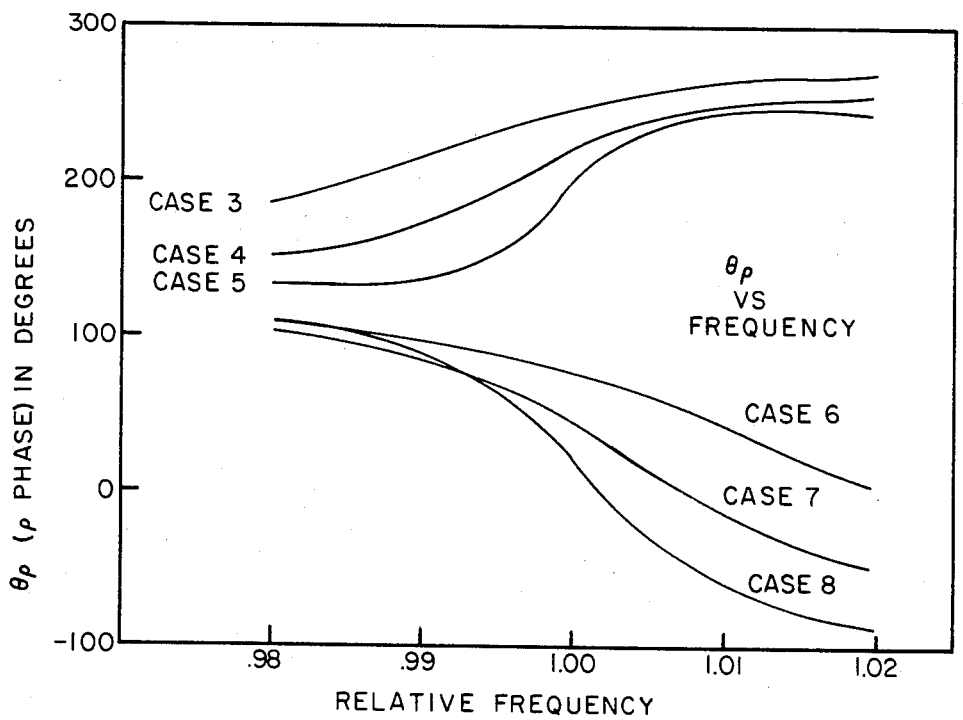

The region of interest to the practitioner of the invention characteristically lies near the minimum in magnitude of the reflection coefficient $\rho$. This region can be graphed and evaluated using rectangular coordinates. FIGS. 10A and B show the magnitude and phase change, respectively, of the reflection coefficient $\rho$ for the eight cases tabulated in Table I.

TABLE I

| Case # | $Z_2$ | $Z_1$ | $\rho$ | Q | $C_1$ | $L_w$ | $C_2$ |
|---|---|---|---|---|---|---|---|
| 1 | 1 | 1 | 0 | 3 | 0.4775 | 0.9550 | 0.4775 |
| 2 | 1 | 1 | 0 | 10 | 1.5915 | 0.03152 | 1.5915 |
| 3 | 1 | 1.2 | −20.8 dB | 3 | 0.4775 | 0.1005 | 0.4399 |
| 4 | 1 | 1.2 | −20.8 dB | 5 | 0.7958 | 0.06425 | 0.7289 |
| 5 | 1 | 1.2 | −20.8 dB | 10 | 1.5916 | 0.03303 | 1.4541 |
| 6 | 1 | 0.8 | −19.1 dB | 3 | 0.4775 | 0.08985 | 0.5264 |
| 7 | 1 | 0.8 | −19.1 dB | 5 | 0.7958 | 0.05784 | 0.8852 |
| 8 | 1 | 0.8 | −19.1 dB | 10 | 1.5916 | 0.02983 | 1.7772 | where,
$\rho$ = Voltage Reflection Coefficient at Input to Mismatch Network, and
Q = Circuit Q, Independent Variable.

With reference to Table I and FIGS. 10A and B, for a small percentage bandwidth and Q, selection of an operating frequency permits the selection of a slope of the absolute value of $\rho$, and the phase slope (phase change characteristic) can be set by the choice of the circuit Q.

It should be evident from Table I and FIGS. 10A and B that, for a given circular leakage frequency characteristic, it is possible to select the values of $L_2$ (conventionally obtainable by conversion from the inductance $L_w$ in Table I), $C_1$, and $C_2$ for the mismatch network in the waveguide 72 so that the vector representing the portion of the transmission signal reflected will closely track the vector representing the circulator leakage signal in both magnitude and phase over a useful portion of the leakage signal frequency range. This portion is referred to as the isolation bandwidth. Use of the mismatch network in the waveguide 72 permits the realization of a useful isolation bandwidth that exceeds any obtainable in a conventional matching network, which, by design, concentrates on the elimination of the antenna reflection portion of the leakage signal.

It is possible that after magnitude and phase tracking with respect to frequency over the useful isolation bandwidth have been established by selection of values of the reactive components $C_1$, $C_2$ and $L_w$, the leakage and reflection vectors will not be substantially opposite in phase over the bandwidth of interest. It is the purpose of the section of the transmission waveguide 72 indicated by $L_1$ to establish close antiphase at the middle of the isolation frequency range. FIG. 11 illustrates, in conventional Smith chart format, how the reflection vector of case 4 in Table I can be repositioned in phase by selection of a value for the length $L_1$. One plot 88 of the vector positions over the isolation bandwidth of interest is shown in FIG. 11 in a phase sector corresponding to $L_1=0$. This plot corresponds to Case 4 in Table I and FIGS. 10A and B. Rotation of the plot of vector positions effected by choice of $L_1=0.2\lambda_0$ where $\lambda_0$ is at the center of the isolation bandwidth, is illustrated by the plot 89. The effect is to rotate each vector plotted for $L_1=0$ clockwise by an amount proportional to the length $L_1=0.2\lambda_0$ and the relative frequency of the vector.

Because the vector relative frequency factor causes the angle of the vectors relative to each other to change, the originally established phase and magnitude tracking will be altered. This necessitates a redesign of the mismatch network (the pi network of FIG. 9) to again restore tracking for the new length of $L_1$. Of course this new network will have a slightly different phase offset requiring still another value change in $L_1$, and so on until adequate convergence of values has been established for maximum cancellation of the leakage signal over the isolation bandwidth of interest.

One of many ways of performing the task of designing the mismatch network in the waveguide 72 of FIG. 7 follows; it should be evident to the skilled artisan that a computer can be used to perform calculations and evaluate the overall performance. The design technique consists of the following design steps:

1. Assume the equivalent impedances $Z_1$ and $Z_2$ are matched over the isolation frequency range of interest.
2. Using a vector measurement technique such as S-parameters, characterize the circulator leakage signal available from circulator port $P_1$ in magnitude and phase with respect to frequency with circulator port $P_3$ terminated.
3. Characterize the circulator transmission paths, transmitter to antenna and antenna to receiver (ports $P_2-P_3$ and ports $P_3-P_1$) in magnitude and phase with respect to frequency.
4. From the data of steps 2 and 3 derive the reflection parameters $\rho$ (magnitude at the center of the frequency), $d|\rho|/df$ (magnitude slope), and $d\phi\rho/df$ (phase slope) required for magnitude and phase tracking of the leakage signal.
5. Set the value of $C_1$, $C_2$, and $L_2$ for the required values obtained in steps 3 and 4.
6. From the circuit values derived in step 5, find the phase shift of the reflected signal at the center of the frequency band and determine the minimum phase length $L_1$ required to establish antiphase with the circulator leakage signal.
7. Add the incremental phase shift introduced by the phase length $l_1$ to the phase characteristics measured in step 3.
8. Calculate a new value of $d\phi\rho/df$ (reflected isolation signal phase slope) and compare with the value calculated in step 4. If the new value differs substantially from the previous value, repeat step 5.
9. Calculate the cancellation produced by combining the leakage and reflected isolation signals over the isolation frequency range and compare to design requirements. The network value calculated in step 5 can be varied slightly to maximize the isolation frequency range if required.
10. When the antenna is not well matched over the isolation frequency range as assumed in step 1, it will be necessary to sum the portion of the transmission signal reflected by the antenna 16 with the circulator leakage signal before beginning design of the reactive reflector. The line length $L_3$ of the waveguide 72 in FIG. 7 can be varied to cause the antenna reflection to destructively sum with the circulator leakage, thereby effectively reducing the circulator leakage that must be cancelled by the isolation apparatus of the invention.

Once the component values of the pi network of FIG. 9 and the waveguide section length $L_1$ have been determined according to steps 1–10, the values can be incorporated appropriately into the isolation apparatus 12 and fine tuning of the reflected isolation signal effected through the action of the varactor diodes 64 and 66, which was described hereinabove.

It should be evident to the skilled practitioner that, although the invention described hereinabove is specified as operating in or with an RF waveguide, the invention may also be practiced in or with alternate forms of transmission lines such as coaxial, microstrip, and stripline.

Obviously, many modifications and variations of the above-described isolation apparatus are possible in light of the foregoing teachings. It is therefore to be understood that within the scope of the appended claims, the invention may be practice otherwise than as specifically described.

I claim:

1. In a radar system having a transmitter which operates continuously to produce a transmission signal, a receiver which operates simultaneously with said transmitter to receive target signals reflected from irradiated targets, an antenna, and a circular for simultaneously coupling said transmitter and said receiver to said antenna while isolating said receiver from said transmission signal, the improvement comprising:
   waveguide means connected between said circulator and said antenna for conducting said transmission signal to said antenna from said circulator and for conducting said target signals from said antenna to said circulator; and
   reactive means extending into said waveguide means for reflecting to said circulator a reflected portion of, said transmission signal which, over a predetermined leakage signal frequency range, has a magnitude that is substantially equal to the magnitude of a leakage portion of said transmission signal transmitted by said circulator to said receiver and which, over said predetermined leakage signal frequency range, has phase change characteristics substantially opposite to the phase change characteristics of said leakage portion.

2. The system of claim 1 wherein said reactive means includes mechanically adjustable means extending into said waveguide means for being adjusted to reflect a first cancelling signal having substantially the same magnitude and phase change characteristics as said leakage portion over said predetermined frequency range.

3. The system of claim 2 wherein said reactive means includes electronically adjustable means located at a predetermined position within said waveguide means between said circulator and said mechanically adjustable means for, after said mechanically adjustable means have been adjusted to reflect said first cancelling signal, being adjusted to reflect a pair of orthogonal fine cancelling signals which are added by said waveguide means to said first cancelling signal to form said reflected portion.

4. The system of claim 3 wherein said waveguide means includes a waveguide section connecting said reactive means and said circulator that has a first predetermined length which adjusts the phase of said reflected portion to be substantially opposite the phase of said leakage portion over said predetermined frequency range.

5. An apparatus for isolating a radar receiver which operates simultaneously with an associated radar transmitter in a continuous-wave, single antenna radar system, comprising:

a circulator for connecting to a single radar antenna a continuously-operating radar transmitter and a radar receiver which operates simultaneously with said transmitter;

waveguide means for providing radar signal conductivity between said circulator and a radar antenna; and reactive means extending into said waveguide means for reflecting to said circulator a reflected portion of a transmission signal being conducted by said waveguide means from said circulator for transmission by a radar antenna, said reflected portion having, over a predetermined leakage signal frequency range, a magnitude that is substantially equal to the magnitude of a leakage portion of said transmission signal that is conducted by said circulator from a transmission signal source to a radar receiver connected to said circulator and having, over said predetermined leakage signal frequency range, a phase change characteristic that is substantially opposite to the phase change characteristic of said leakage signal.

6. The apparatus of claim 5 wherein said waveguide means includes, connecting said reactive means and said circulator, a waveguide section that has a first predetermined length which adjusts the phase of said reflected portion to be substantially opposite the phase of said leakage portion over said predetermined frequency range while said reflected portion travels through said waveguide section toward said circulator.

7. The apparatus of claim 5 wherein said reactive means includes mechanically adjustable means extending into said waveguide means for being adjusted to reflect a first cancelling signal having substantially the same magnitude and phase change characteristics as said leakage portion over said predetermined frequency range.

8. The apparatus of claim 7 wherein said reactive means includes electronically adjustable means positioned between said circulator and said mechanically adjustable means for, after said mechanically adjustable means have been adjusted to reflect said first cancelling signal, being adjusted to reflect a pair of orthogonal fine cancelling signals which are added by said waveguide means to said first cancelling signal to form said reflected portion.

9. The apparatus of claim 8 wherein said waveguide means includes, connecting said reactive means in said circulator, a waveguide section that has a first predetermined length which adjusts the phase of said reflected portion to be substantially opposite the phase of said leakage portion over said predetermined frequency range while said reflected portion travels through said waveguide section toward said circulator.

10. The apparatus of claim 9 wherein said mechanically-adjustable means includes a pair of adjustable capacitors separated by a section of waveguide having a second predetermined length $L_2$.

11. The apparatus of claim 10 wherein said mechanically-adjustable means includes a pair of tuning screws in said waveguide means, said tuning screws separated by a predetermined distance $L_2$.

* * * * *